US011338752B2

United States Patent
Bleeck et al.

(10) Patent No.: US 11,338,752 B2
(45) Date of Patent: May 24, 2022

(54) AIRBAG MODULE AND AIRBAG SYSTEM

(71) Applicant: Vitesco Technologies GmbH, Regensburg (DE)

(72) Inventors: Matthias Bleeck, Pentling (DE); Christoph Aumueller, Falkenstein (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 16 days.

(21) Appl. No.: 16/963,983

(22) PCT Filed: Mar. 21, 2019

(86) PCT No.: PCT/EP2019/057144
§ 371 (c)(1),
(2) Date: Jul. 22, 2020

(87) PCT Pub. No.: WO2019/185451
PCT Pub. Date: Oct. 3, 2019

(65) Prior Publication Data
US 2021/0039577 A1    Feb. 11, 2021

(30) Foreign Application Priority Data

Mar. 29, 2018 (DE) ..................... 10 2018 204 825.8

(51) Int. Cl.
*B60R 21/263* (2011.01)
*B60R 21/264* (2006.01)
(Continued)

(52) U.S. Cl.
CPC .......... *B60R 21/0134* (2013.01); *B60R 21/26* (2013.01); *B60R 21/263* (2013.01);
(Continued)

(58) Field of Classification Search
CPC ................ B60R 21/263; B60R 21/276; B60R 2021/26094; B60R 2021/2636; B60R 2021/2765
See application file for complete search history.

(56) References Cited

U.S. PATENT DOCUMENTS 2,834,609 A * 5/1958 Bertrand ............... B60R 21/276
280/739
5,074,583 A * 12/1991 Fujita ................ B60R 21/01536
280/730.1
(Continued)

FOREIGN PATENT DOCUMENTS

DE    102012210943    1/2014
DE    102013207594    10/2014
(Continued)

OTHER PUBLICATIONS

PCT Examiner Magnus Petersson, English translation of the International Search Report of the International Searching Authority for International Application PCT/EP2019/057144, dated Jun. 6, 2019, 2 pages, European Patent Office, HV Rijswijk, Netherlands.
(Continued)

*Primary Examiner* — Barry Gooden, Jr.

(57) ABSTRACT

An airbag module has an airbag and a gas generator, between which a gas supply with a valve arrangement is arranged. The valve arrangement has an electrically actuatable pilot valve and a hydraulic transmission arrangement for amplifying a stroke action of the pilot valve.

14 Claims, 7 Drawing Sheets

(51) Int. Cl.
  *B60R 21/0134* (2006.01)
  *B60R 21/26* (2011.01)
  *F15B 15/02* (2006.01)
  *B60R 21/01* (2006.01)

(52) U.S. Cl.
  CPC ............ *B60R 21/264* (2013.01); *F15B 15/02* (2013.01); *B60R 2021/01211* (2013.01); *B60R 2021/26094* (2013.01)

(56) References Cited

U.S. PATENT DOCUMENTS

| | | | | |
|---|---|---|---|---|
| 5,197,759 | A * | 3/1993 | Kroiss | B60R 21/268 |
| | | | | 280/736 |
| 5,709,405 | A * | 1/1998 | Saderholm | B60R 21/2171 |
| | | | | 280/736 |
| 5,871,231 | A * | 2/1999 | Richards | B60R 21/276 |
| | | | | 280/735 |
| 5,947,514 | A | 9/1999 | Keller et al. | |
| 6,068,288 | A * | 5/2000 | Karolek | B60R 21/26 |
| | | | | 280/735 |
| 6,176,518 | B1 * | 1/2001 | Faigle | B60R 21/26 |
| | | | | 280/736 |
| 9,573,557 | B2 | 2/2017 | Wolf et al. | |
| 2002/0185845 | A1 * | 12/2002 | Thomas | B60R 21/276 |
| | | | | 280/729 |
| 2003/0075223 | A1 * | 4/2003 | Breed | B60R 21/276 |
| | | | | 137/625.3 |
| 2004/0169359 | A1 * | 9/2004 | Isakov | B60R 21/276 |
| | | | | 280/736 |
| 2005/0189752 | A1 * | 9/2005 | Itoga | B60R 21/231 |
| | | | | 280/741 |
| 2006/0279075 | A1 * | 12/2006 | McCormick | B60R 21/26 |
| | | | | 280/736 |
| 2007/0181030 | A1 * | 8/2007 | Goldenblum | B60R 21/02 |
| | | | | 102/502 |
| 2007/0267855 | A1 * | 11/2007 | Lewis | B60R 21/2338 |
| | | | | 280/739 |
| 2007/0290490 | A1 * | 12/2007 | Parizat | B60R 21/264 |
| | | | | 280/736 |
| 2008/0030012 | A1 * | 2/2008 | Mattes | B60R 21/01504 |
| | | | | 280/736 |
| 2008/0251348 | A1 * | 10/2008 | Bock | B60R 21/272 |
| | | | | 193/25 B |
| 2010/0012877 | A1 * | 1/2010 | Haege | F16K 39/022 |
| | | | | 251/318 |
| 2010/0175764 | A1 | 7/2010 | Cecchin et al. | |
| 2012/0193899 | A1 * | 8/2012 | Santana-Gallego | B60R 21/268 |
| | | | | 280/736 |
| 2015/0054269 | A1 * | 2/2015 | Kolatschek | B60R 21/268 |
| | | | | 280/737 |
| 2016/0059820 | A1 * | 3/2016 | Wolf | B60R 21/268 |
| | | | | 280/742 |
| 2016/0121842 | A1 * | 5/2016 | Nitschke | B60R 21/263 |
| | | | | 102/530 |
| 2016/0339865 | A1 | 11/2016 | Heyer et al. | |
| 2021/0054946 | A1 * | 2/2021 | Bleeck | B60R 21/263 |
| 2021/0221325 | A1 * | 7/2021 | Rea | B60R 21/268 |

FOREIGN PATENT DOCUMENTS

| | | |
|---|---|---|
| DE | 102014210156 | 12/2015 |
| WO | WO 00/021799 | 4/2000 |
| WO | WO 2007/003406 | 1/2007 |

OTHER PUBLICATIONS

PCT Examiner Nora Lindner, PCT International Preliminary Report on Patentability including English Translation of PCT Written Opinion of the International Searching Authority for International Application PCT/EP2019/057144, dated Sep. 29, 2020, 5 pages, International Bureau of WIPO, Geneva, Switzerland.

German Examiner Johannes Weber, German Office Action in German Patent Application No. 10 2018 204 825.8, dated Feb. 21, 2019, 7 pages, with partial English translation, 4 pages.

* cited by examiner

AIRBAG MODULE AND AIRBAG SYSTEM

FIELD OF THE INVENTION

The invention relates to an airbag module and an airbag system which form part of an occupant restraint system usually found in motor vehicles.

BACKGROUND INFORMATION

Nowadays, airbag systems, together with safety belts, form the most important passive safety elements of an occupant restraint system in a motor vehicle, which is intended to counteract serious injuries in the event of a collision of the motor vehicle with an obstacle.

Airbag systems mostly have multiple airbag modules which each comprise at least one airbag which, if a crash occurs, is filled with an airbag gas. The airbag deploys within a short period of time between 10 ms and 50 ms between an occupant and parts of the interior of the motor vehicle, forming a cushion. This prevents the occupant crashing into hard parts of the interior such as, for example, a steering wheel or instrument panel.

The airbag gas is provided in the gas generator with a high pressure between 50 bar and 1000 bar. The gas generator can be a hot gas generator (pyrotechnic gas generator), a cold gas generator or even a hybrid gas generator.

Airbag systems further have at least one sensor which, in the event of a collision, detects a collision time $t_0$. Following a certain period of time (ms-range) following said collision time $t_0$, the triggering of the airbag is started. To this end, the airbag modules have a gas generator which provides the airbag gas with which the airbag is to be filled. The airbag gas can, for example, be provided by igniting a solid propellant which, on combustion, liberates the airbag gas, or can be provided by gas stored at high pressure. The airbag gas from the gas generator flows into the airbag, fills the latter and ensures that it deploys.

Currently, the airbag system triggers shortly after the collision time $t_0$, i.e. only once the collision has already occurred. With future airbag systems the plan is, however, to identify a time $t_n$, at which a collision is unavoidable by means of suitable sensors and by evaluating the signals thereof. Said time $t_n$ lies in the so-called pre-crash phase before the actual time $t_0$ of the collision. It is planned that said information will be used to activate the airbag system even before the collision, in order to thus be able to protect the occupants of a vehicle from injuries even better.

To date, the plan has been to use two-stage airbag modules for this purpose, in which two gas generators are provided which are triggered in a staggered manner. Here, a constant mass flow $\dot{m}$ of airbag gas is introduced into each of the airbags in two consecutive phases.

SUMMARY OF THE INVENTION

It is an object of the invention to propose a further improved airbag module for an airbag system.

This object can be achieved with an airbag module having the combination of features according to the present invention as set forth herein, and with an airbag system having such an airbag module.

An airbag module has an airbag which is filled with a pressurized airbag gas during operation, and a gas generator for providing the pressurized airbag gas for the airbag. The airbag module further has a gas supply between the gas generator and airbag for supplying the provided pressurized airbag gas from the gas generator into the airbag. A valve arrangement for releasing a predefined mass flow $\dot{m}$ of the pressurized airbag gas from the gas generator is arranged in the gas supply.

The mass flow $\dot{m}$ of the airbag gas is defined by the mass which flows to the airbag per unit of time (m/t).

The valve arrangement has an electrically actuatable pilot valve for controlling the predefined mass flow $\dot{m}$ of the airbag gas and a hydraulic gearing arrangement i.e. pneumatic transmission arrangement for amplifying a stroke action of the pilot valve.

The fact that a specifically electrically actuatable valve arrangement is provided in the gas supply between the gas generator and the airbag means that it is possible to be able to specifically adapt the filling of the airbag with the airbag gas to a collision course. In order to be able to perform an optimum filling of the airbag, e.g. in that the airbag is already prefilled prior to the expected collision and is later topped up, it is necessary to control the mass flow $\dot{m}$ of the airbag gas from the gas generator. With the previously known airbag systems, in which two gas generators are triggered in a staggered manner, it is only possible to produce a constant mass flow $\dot{m}$ in the airbag, however it is not possible to specifically control the mass flow $\dot{m}$. The fact that only the valve arrangement is provided with the electrically actuatable pilot valve means that the mass flow $\dot{m}$ can be specifically controlled at any time before, during and after the collision via the valve arrangement and, consequently, the filling of the airbag can be regulated at any time. It is thus possible to be able to specifically adapt the filling of the airbag to the collision course.

In principle, it would already be possible, for example, to facilitate an active controlling of the filling of the airbag via an individual electrically actuatable valve such as, for example, a solenoid valve. If, however, a solenoid valve is used, the size and the weight of the magnets used produce a certain inertia of the system and also take up a relatively large amount of installation space. Therefore, a small electrically actuatable pilot valve, which can be configured as a solenoid valve for example, is merely used in this case. Only a small magnet is necessary here since, in addition to the pilot valve itself, which assumes the actual control of the mass flow $\dot{m}$, a hydraulic gearing i.e. pneumatic transmission arrangement is provided, which amplifies the actual stroke of the pilot valve. As a result, it is not necessary to use a very large magnet, but instead the desired mass is adjusted by the hydraulic gearing i.e. pneumatic transmission arrangement, while the mass flow t is actually controlled via the electrically actuatable pilot valve.

The hydraulic gearing arrangement advantageously has a control chamber which is fluidically connected via a connecting bore and via a throttle bore, which is arranged separately from the connecting bore, with the gas generator. The control chamber is further fluidically connected via an outlet bore with the airbag. In the control chamber, a closing element for sealing and releasing a valve seat is arranged in the connecting bore or in the outlet bore. The closing element is configured as a separating element which subdivides the control chamber into a first control chamber region and into a second control chamber region which is separate from the first control chamber region.

The throttle bore advantageously fluidically connects the first control chamber region with the gas generator, wherein the pilot valve for controlling a fluid pressure of the airbag gas is configured in the first control chamber region.

The closing element is arranged as a separating element between the first control chamber region and the second control chamber region. This means that a static fluid pressure both from the side of the first control chamber region and from the side of the second control chamber region acts on the closing element. If the system is pressure-equalized, the closing element does not move, but stops in its initial position. If, however, a different pressure acts from the side of the first control chamber region to that from the side of the second control chamber region, the closing element moves—depending on the arrangement of the two control chamber regions—into an opening or respectively closing position. In the opening position, it releases the gas supply so that airbag gas can flow from the gas generator into the airbag. In the closing position, however, it seals the gas supply so that no airbag gas flows from the gas generator into the airbag.

The prevailing fluid pressure from the side of the first control chamber region is controlled by the pilot valve. The latter has a pilot valve closing element which seals an inlet bore to the pilot valve. The pilot valve is advantageously fluidically connected with the control chamber via the inlet bore and, indeed, in particular with the first control chamber region. If the pilot valve opens, airbag gas can flow out from the first control chamber region via the pilot valve, the fluid pressure in the first control chamber region falls, and a fluid pressure which acts from the second control chamber region on the closing element is greater than the fluid pressure which acts from the first control chamber region on the closing element. The closing element therefore changes its position, in particular it moves into an opening position, and airbag gas flows from the gas generator into the airbag.

The pilot valve also advantageously has an outlet bore which forms a fluidic connection of the pilot valve with the airbag. Thus, airbag gas also flows from the first control chamber region via the inlet bore and the outlet bore of the pilot valve to the airbag.

The connecting bore, which connects the gas generator with the control chamber region, connects the gas generator in particular with the second control chamber region.

The closing element is advantageously configured such that a first pressure-action surface on the closing element from a side of the first control chamber region is greater than a second pressure-action surface from a side of the connecting bore in which the valve seat is formed, or from a side of the outlet bore in which the valve seat is formed.

The closing element can accordingly be configured such that, if it is located in the valve seat, it seals the outlet bore towards the airbag, or it seals the connecting bore between the control chamber and the gas generator.

The closing element is preferably configured as a ball. However, it is also possible to configure the closing element as a cone, for example. The only important thing, in this case, is that the pressure-action surfaces from the side of the first control chamber region and from the side of the second control chamber region differ such that a movement of the closing element can be induced by a pressure change in the two control chamber regions.

It is possible, by means of a diameter of the throttle bore, to adjust the prevailing fluid pressure in the first control chamber region, compared with the prevailing fluid pressure in the second control chamber region. It is therefore possible to hold the prevailing fluid pressure in the first control chamber region just below a switching pressure, i.e. the condition of the valve arrangement in which the closing element starts moving, or just above the switching pressure. The diameter of the inlet bore to the pilot valve can also be adjusted in this respect, in order to influence the prevailing fluid pressure.

The pilot valve is preferably configured as a normally closed pilot valve and has a compression spring which biases a pilot valve element into a closing position onto a pilot valve seat in the inlet bore, wherein the compression spring fixes an opening pressure of the pilot valve in particular in such a manner that the opening pressure is greater than a prevailing high pressure of the airbag gas in the gas generator due to the activation of the gas generator. Thus, it can advantageously be avoided that the pilot valve opens unintentionally and, consequently, activates the entire valve arrangement.

Alternatively, it is however also possible for the pilot valve to be configured as a normally open pilot valve. Then, the pilot valve is actively kept closed by energizing and is only opened by removing the current. To this end, a compression spring is advantageously provided, which biases the pilot valve into a defined opening position.

An airbag system has an airbag module as described above and further has a control device for actuating the pilot valve, wherein the control device is designed to identify a collision course and, based on the identified collision course, to define a mass flow $\dot{m}$ of the airbag gas to be supplied to the airbag.

Advantageously, the airbag system further has at least one sensor which captures parameters for calculating a probable collision course over time before a collision, and transfers these to the control device.

The control device is preferably designed to define the probable collision course from the captured parameters and, based thereon, to define the required mass of the airbag gas in the airbag at any time of the collision course.

It is therefore possible to identify, via the captured parameters of the sensor, when a collision is unavoidable, when for example the collision time $t_n$ is present, which forces will probably act during the collision, and to conclude therefrom to what extent the airbag has to be inflated in order to avoid injuries to the occupant.

To this end, it is advantageous if not only a speed of the vehicle and a spacing from an obstacle are captured, but also the characteristics of occupants such as, for example, size and weight, so that the activation of the airbag can be performed by occupant parameters.

For example, the control device is designed to actuate the pilot valve in such a manner that the pilot valve releases multiple defined partial masses of the required mass of the airbag gas from the gas generator at different times of the collision course. For example, the pilot valve can already release a partial mass into the airbag prior to the expected collision, so that the latter is already pre-filled. It is further possible to fill the airbag with a further partial mass during the collision and also, following the actual collision, if the occupant reacts in a delayed manner to the negative acceleration due to the inertia, to top up the airbag with a further partial mass.

BRIEF DESCRIPTION OF THE DRAWINGS

Advantageous configurations of the invention are explained in greater detail below with reference to the appended drawings, wherein.

DETAILED DESCRIPTION OF EXAMPLE EMBODIMENTS OF THE INVENTION

Figure 1:
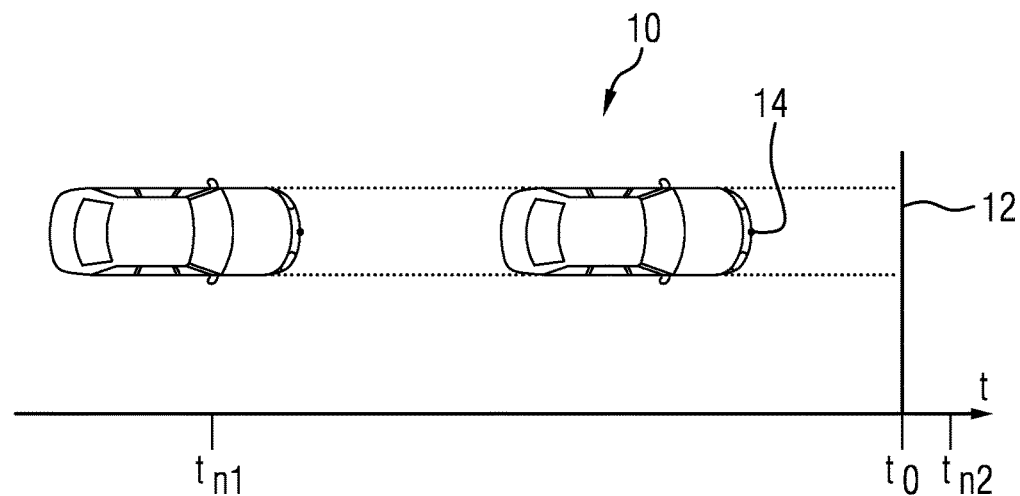
FIG. 1 shows a schematic top view of a motor vehicle which is approaching an obstacle along a time axis t.

FIG. 1 shows a schematic top view of a motor vehicle 10 which is approaching an obstacle 12, with which it will in all probability crash. The approaching process is depicted over time with reference to a time axis with a passage of time t, wherein $t_0$ defines a collision time, i.e. the time at which the motor vehicle 10 and the obstacle 12 will make contact.

The motor vehicle 10 has a sensor 14 which captures a speed of the motor vehicle 10 and a distance from the obstacle 12. The speed and the distance are parameters which are detected over time before the probable collision, and from which it is possible to calculate a probable collision course.

Figure 2:
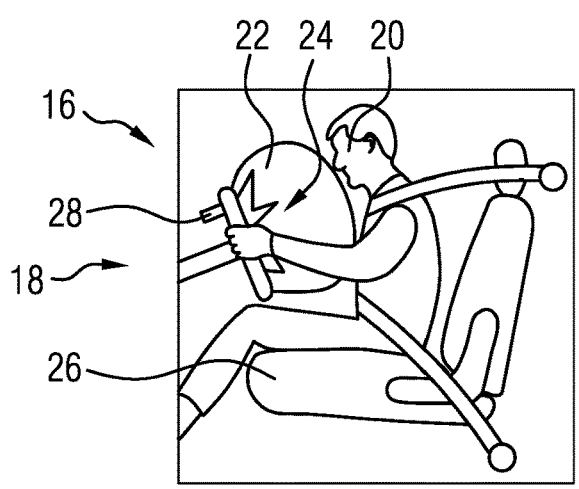
FIG. 2 shows a snapshot at a collision time $t_0$ of the vehicle from FIG. 1 with the obstacle, if an airbag module in the interior of the vehicle is activated.
Figure 2:
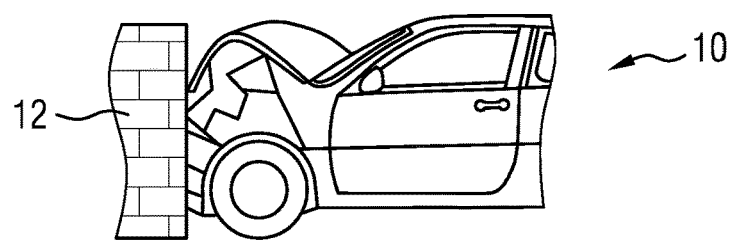

FIG. 2 shows an interior view (top) and an exterior view (bottom) of the motor vehicle 10 from FIG. 1 as a snapshot at the time $t_0$ of the collision.

In the interior view, a snapshot of an activation of an airbag module 16 of an airbag system 18 in the motor vehicle 10 can be seen, if, as is depicted in the exterior view of the motor vehicle 10, the motor vehicle 10 has collided with the obstacle 12.

In order to protect an occupant 20 in the motor vehicle 10 from injuries, an airbag 22 of the airbag module 16 is filled with an airbag gas 24, as a result of which it deploys and separates the occupant 20 from hard parts of the motor vehicle 10. As a result, injuries of the occupant 20 can be avoided.

In the motor vehicle 10 a further sensor 26 is arranged, which captures characteristics of the occupant 20 such as, for example, his size and his weight.

On the basis of the parameters which the sensors 14, 26 capture, it is possible to calculate a collision course of the unavoidable collision in advance, and to establish at which pre-determined times to and how much the airbag 22 has to be inflated, in order to be able to provide the occupant 20 with maximum protection.

To this end, a control device 28 captures signals of the sensors 14, 26 and establishes the probable collision course from said signals. As a result, the control device 28 can define which mass flow ṁ of the airbag gas 24 has to be supplied to the airbag 22.

To ensure that the airbag 22 can be specifically filled in accordance with the predicted collision course, a special airbag module 16 is provided, which is shown in FIGS. 3 to 8 in a schematic longitudinal sectional view.

Figure 3:
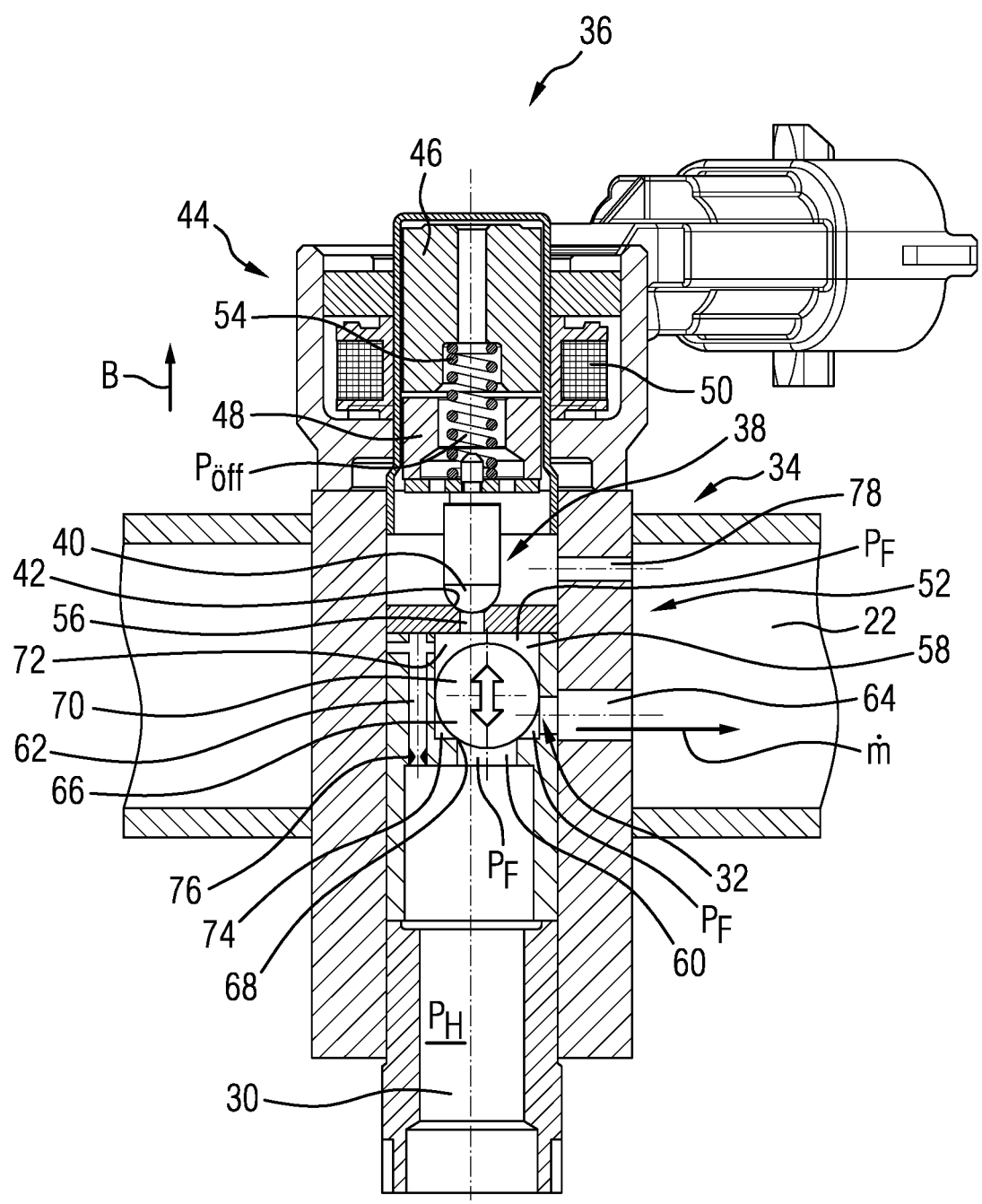
FIG. 3 shows a schematic longitudinal sectional view of a first embodiment of the airbag module from FIG. 2 with a valve arrangement, in which a pilot valve is configured as a normally closed pilot valve.

A first embodiment of the airbag module 16 is initially described with respect to FIG. 3. The airbag module 16 has, in addition to the airbag 22, a gas generator 30 which provides the airbag gas 24 for the airbag 22. In this case, it is possible that the airbag gas 24 is provided via a cold gas generator and is, consequently, present in a gaseous form from the outset. It is, however, also possible that a pyrotechnic gas generator 30 is used, wherein a solid propellant is located in the gas generator 30, which solid propellant is initially ignited in order to liberate the airbag gas 24 when necessary.

A gas supply 32 is arranged between the airbag 22 and the gas generator 30 via which the airbag gas 24 can be conducted from the gas generator 30 to the airbag 22.

A valve arrangement 34 is arranged in the gas supply 32, which valve arrangement has an electrically actuatable pilot valve 36 which can thus be specifically actuated via the control device 28 such that the gas supply 32 can be specifically opened or respectively sealed. Thus, a mass flow ṁ of the airbag gas 24 supplied from the gas generator 30 to the airbag 22 can be controlled specifically and in a pre-defined manner.

The pilot valve 36 has a valve region 38, in which a pilot valve element 40 interacts with a pilot valve seat 42, in order to hold the pilot valve 36 in a closing position.

The pilot valve 36 further has an actuator region 44 which, in an electrically actuated condition, exerts a movement force B on the pilot valve element 40 so that the pilot valve element 40 moves between its closing position and its opening position.

The actuator region 44 has magnetic elements such as a stationary pole piece 46 and a movable armature also called an anchor 48 herein, wherein the armature or anchor 48 is coupled to the pilot valve element 40. As a result, the anchor 48 transfers its movement to the pilot valve element 40. In order to induce the movement of the anchor 48, the actuator region 44 comprises a coil 50 which is energized for this reason.

The coil 50 with the magnetic elements of the pilot valve 36 forms a magnet.

Normally, it would be sufficient if the pilot valve element 40 were to seal the gas generator 30, so that by simply opening and closing the pilot valve element 40, a mass flow ṁ from the gas generator 30 to the airbag 22 could be regulated.

To this end, however, a relatively large magnet would be necessary, which would require a relatively large installation space in the airbag module 16 and would be relatively inert i.e. inertially massive as well.

Therefore, it is now proposed in the embodiments described below to interpose a pneumatic amplifying transmission, also called a hydraulic gearing 52 herein, between the gas generator 30 and the pilot valve 36, which pneumatic amplifying transmission amplifies or intensifies a stroke of the pilot valve element 40. As a result, the pilot valve 36 and, consequently, also the magnet arrangement can be configured considerably smaller and therefore require less installation space and can switch very quickly.

The pilot valve 36 in FIG. 3 is configured as a normally closed pilot valve 36, i.e., in the unenergized condition, the pilot valve element 40 is located in its closing position. To this end, it is biased by a compression spring 54 in the direction of the closing position. In the closing position, the pilot valve element 40 seals an inlet bore 56 to the pilot valve 36, wherein the inlet bore 56 forms the connection of the pilot valve 36 to the hydraulic gearing arrangement 52.

The hydraulic gearing arrangement 52 is formed from a control chamber 58 which is fluidically connected both via a connecting bore 60 and via a throttle bore 62 with the gas generator 30. The connecting bore 60 and the throttle bore 62 are bores which are arranged separately from one another, which bores open out into the control chamber 58 or respectively into the gas generator 30 at different positions. The control chamber 58 is also fluidically connected via the inlet bore 56 with the pilot valve 36. The control chamber 58 is further fluidically connected via an outlet bore 64 with the airbag 22. In the control chamber 58, a closing element 66 is arranged, which seals a valve seat 68 which, in the first embodiment shown, is arranged in the connecting bore 60. The closing element 66 is configured as a separating element 70 and subdivides the control chamber 58 into a first control chamber region 72 and a second control chamber region 74, wherein the two control chamber regions 72, 74 are separate from one another. The separating element 70 separates the two control chamber regions 72, 74 fluidically from one another, but is nevertheless movably arranged within the control chamber 58.

The throttle bore 62 has an aperture 76 and fluidically connects the gas generator 30 with the first control chamber region 72. The pilot valve 36 is also fluidically connected via the inlet bore 56 with the first control chamber region 72.

The connecting bore 60 fluidically connects the gas generator 30 with the second control chamber region 74.

The closing element 66 is configured as a ball in the present embodiment, on which ball both a fluid pressure $P_F$ of the airbag gas 24 present in the respective control chamber region 72, 74 acts from the side of the first control chamber region 72 and from the side of the second control chamber region 74.

Figure 4:
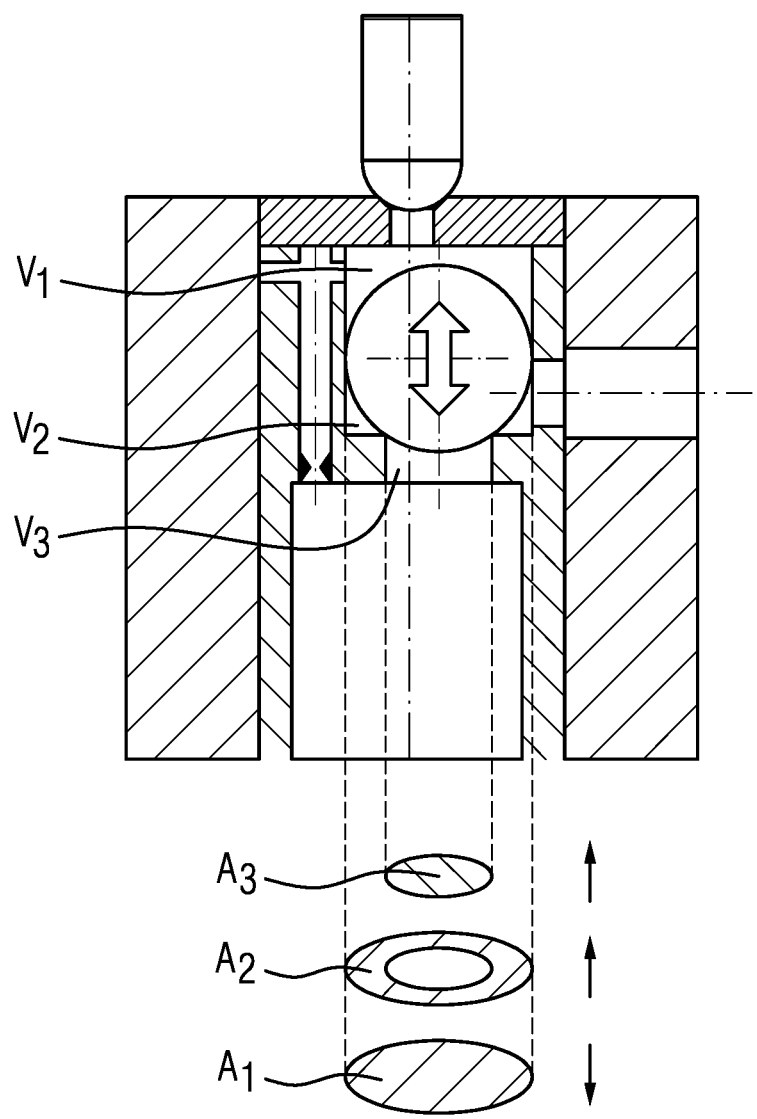
FIG. 4 shows a detailed representation of a hydraulic gearing arrangement for the pilot valve from FIG. 3.

This is shown in a detailed representation in FIG. 4. The first control chamber region 72 forms a first volume $V_1$, in which the airbag gas 24 acts on the upper surface of the closing element 66. This creates a relatively large first pressure-action surface $A_1$ on the closing element 66 from the side of the first control chamber region 72.

The second control chamber region 74 forms a second volume $V_2$ with a corresponding second pressure-action surface $A_2$ which acts from below on the closing element 66 from the side of the second control chamber region 74. The region in the connecting bore 60, which is sealed with the closing element 66, additionally forms a third volume $V_3$ with a corresponding third pressure-action surface $A_3$ from below onto the closing element 66.

The second and third pressure-action surface $A_2$ and $A_3$ are added up and counteract the first pressure-action surface $A_1$.

Figure 5:
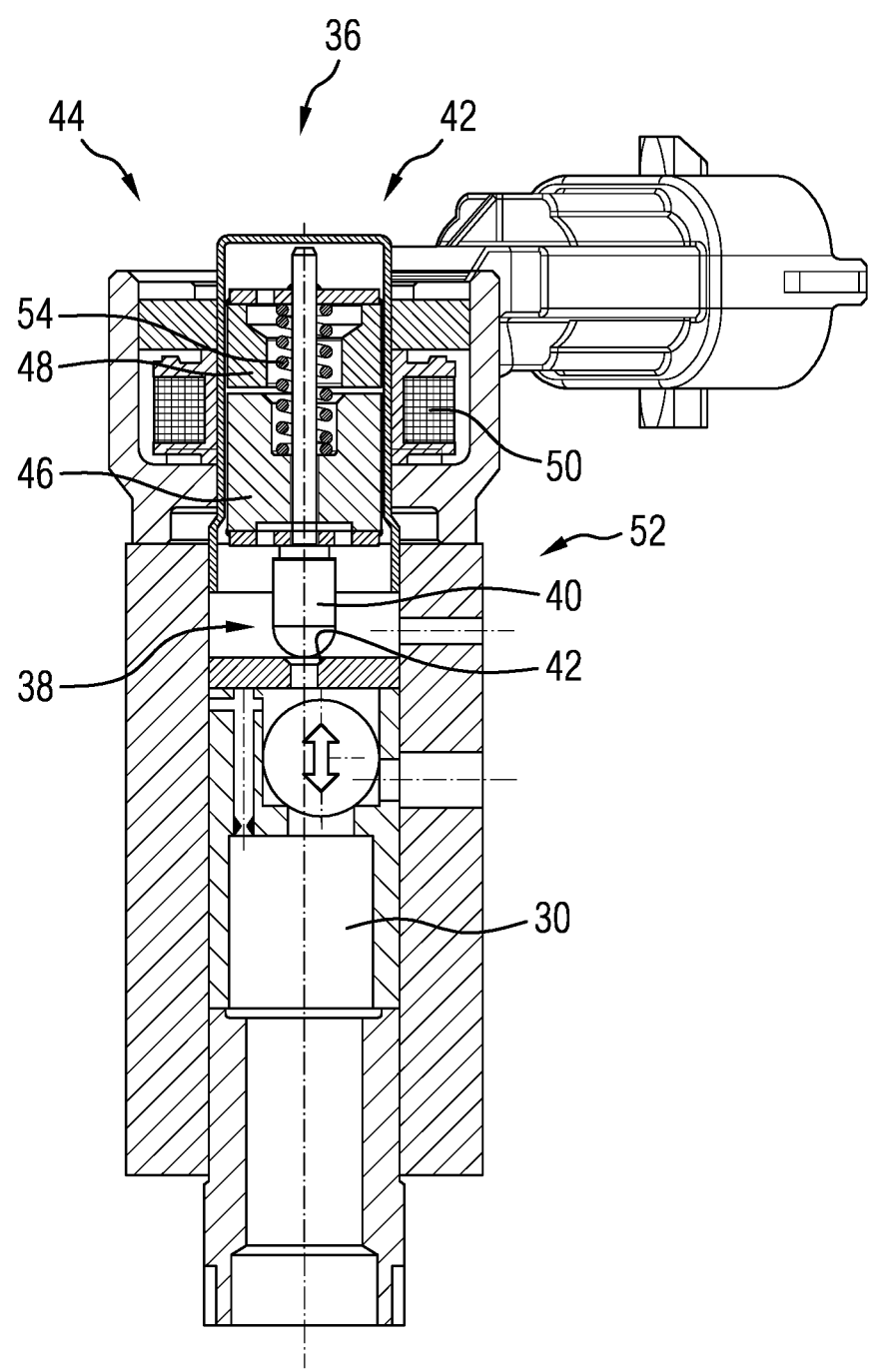
FIG. 5 shows a schematic longitudinal sectional view of the valve arrangement from FIG. 3, wherein the pilot valve is configured as a normally open pilot valve.

The action of the valve arrangement 34, which is shown in the first embodiment in FIG. 3 and FIG. 4, is as follows:

The hydraulic gearing arrangement 52 has the movable closing element 66 in the form of a ball and is actuated by the pilot valve 36. The pilot valve 36 can, as shown in FIG. 3, be normally closed. It is, however, also possible that the pilot valve 36, as shown in FIG. 5, is provided as a normally open pilot valve 36. The selection of the type of the pilot valve 36 is dependent on the safety concept of the airbag system 18.

In the case of the normally closed variant in FIG. 3, the pilot valve 36 seals the inlet bore 56 by the compression spring 54, without current being applied to the coil 50 with the pilot valve element 40. The compression spring 54 is clamped in a region between the anchor 48 and the pole piece 46. When current is applied to the coil 50, a magnetic field and, as a result, a magnetic force is produced between the anchor 48 and the pole piece 46, which acts against the force of the compression spring 54. At the time at which the force of the compression spring 54 is overcome by the magnetic force between the movable anchor 48 and the stationary pole piece 46, the pilot valve 36 switches. The spacing between the movable anchor 48 and the stationary pole piece 46 is reduced and the pilot valve element 40 releases the cross-section of the inlet bore 56. As a result, the airbag gas 24 can flow through the inlet bore 56. The airbag gas 24 is discharged via an outlet bore 78 of the pilot valve 36 to the airbag 22.

The hydraulic gearing arrangement 52 is executed as a seat valve. This means that the closing element 66 seals the valve seat 68. The diameter of the valve seat 68 is smaller than the diameter of the closing element 66, since the latter is configured as a ball. The third pressure-action surface $A_3$ in the region of the connecting bore 60 is formed by the diameter of the valve seat 68. The first pressure-action surface $A_1$ in the first control chamber region 72 is determined by the outside diameter of the closing element 66. The first pressure-action surface $A_1$ in the first control chamber region 72 is greater than the third pressure-action surface $A_3$ on the valve seat 68. If the closing element 66 is therefore supplied from both sides with the same fluid pressure $P_F$, a greater force acts from the first control chamber region 72 due to the larger first pressure-action surface $A_1$ than from the region of the valve seat 68. As a result, the closing element 66 closes and rests on the valve seat 68.

Following activation of the gas generator 30, the fluid pressure $P_F$ in the connecting bore 60 increases. The fluid pressure $P_F$ is therefore present in the region of the valve seat 68 at the closing element 66. The pilot valve 36 in the normally closed variant is closed. Thanks to the stagnation pressure, airbag gas 24 can flow through the aperture 76 into the first control chamber region 72. After a short time, the fluid pressure $P_F$ in the first control chamber region 72 has equalized with the fluid pressure $P_F$ in the region of the valve seat 68. The closing element 66 continues to seal the connecting bore 60.

In order to meter a quantity of the airbag gas 24 to the outlet bore 64 and, consequently, to the airbag 22, the pilot valve 36 is supplied with current, as a result of which the pilot valve 36 releases the inlet bore 56. As a result, the fluid pressure $P_F$ in the first control chamber region 52 drops, the closing element 66 switches and releases the cross-section in the region of the valve seat 68 towards the outlet bore 64. The mass flows r from the outlet bore 64 and the outlet bore 78 are collected and supplied to the airbag 22.

In order to stop the mass flow ṁ of the airbag gas 24 to the airbag 22, the pilot valve 36 is closed again.

Thanks to the actuation of the pilot valve 36, a quantity of the airbag gas 24 can be supplied to the airbag 22 once or repeatedly.

In FIG. 4, the area ratios of the pressure-action surfaces $A_1$, $A_2$ and $A_3$ corresponding to the volumes $V_1$, $V_2$, $V_3$ in the different regions of the control chamber 58 are depicted in the detailed representation. In the connecting bore 60 from the gas generator 30, the third pressure-action surface $A_3$ acts within the seat diameter of the valve seat 68 on the closing element 66. In the second control chamber region 74, i.e. in the second volume $V_2$, a pressure from the outlet bore 64 to the airbag 22 or respectively from the airbag 22 acts on the lower second pressure-action surface $A_2$ of the closing element 66. The second pressure-action surface $A_2$ is located between the outside diameter of the closing element 66 and the seat diameter of the valve seat 68. The pressure in said region is very much lower than in the connecting bore 60. The forces on the closing element 66 act in the same direction on the closing element 66.

In the first control chamber region 72, the corresponding first pressure-action surface $A_1$ acts on the outside diameter of the closing element 66. The direction of action of the force on the closing element 66 is in the opposite direction to the forces on the pressure-action surfaces $A_2$ and $A_3$. If a higher pressure prevails in the first control chamber region 72, the force on the first pressure-action surface $A_1$ is greater than the total of the forces on the pressure-action surfaces $A_2$ and $A_3$. The closing element 66 closes and seals against the valve seat 68. If the prevailing pressure in the first control chamber region 72 is lower, the force on the first pressure-action surface $A_1$ is smaller than the total of the forces on the second and third pressure-action surface $A_2$ and $A_3$. The closing element 66 opens and releases the connecting bore 60 and, consequently, the throughput to the airbag 22 via the outlet bore 64.

In the longitudinal sectional view in FIG. 5, a valve arrangement 34 which corresponds in its mode of action to the valve arrangement 34 from FIG. 3 is shown, wherein the difference merely consists of the pilot valve 36 in FIG. 3 being configured as a normally closed pilot valve 36 and the pilot valve 36 in FIG. 5 being configured as a normally open pilot valve 36. To this end, the components of the actuator region 44, in particular the pole piece 46, the anchor 48 and the compression spring 54, are arranged correspondingly.

The compression spring 54 in FIG. 3 ensures that the pilot valve 36 is securely closed. To this end, an opening pressure $P_{off}$ of the pilot valve 36, which is determined by the biasing force of the compression spring 54, is above a high pressure $P_H$ of the airbag gas 24 in the gas generator 30, which is to be expected on activating the gas generator 30.

In the case of the pilot valve 36 in FIG. 5, a biasing force of the compression spring 54 is designed such that the pilot valve 36 is held in the opening position, wherein the pilot valve element 40 takes up a defined opening position.

Figure 6:
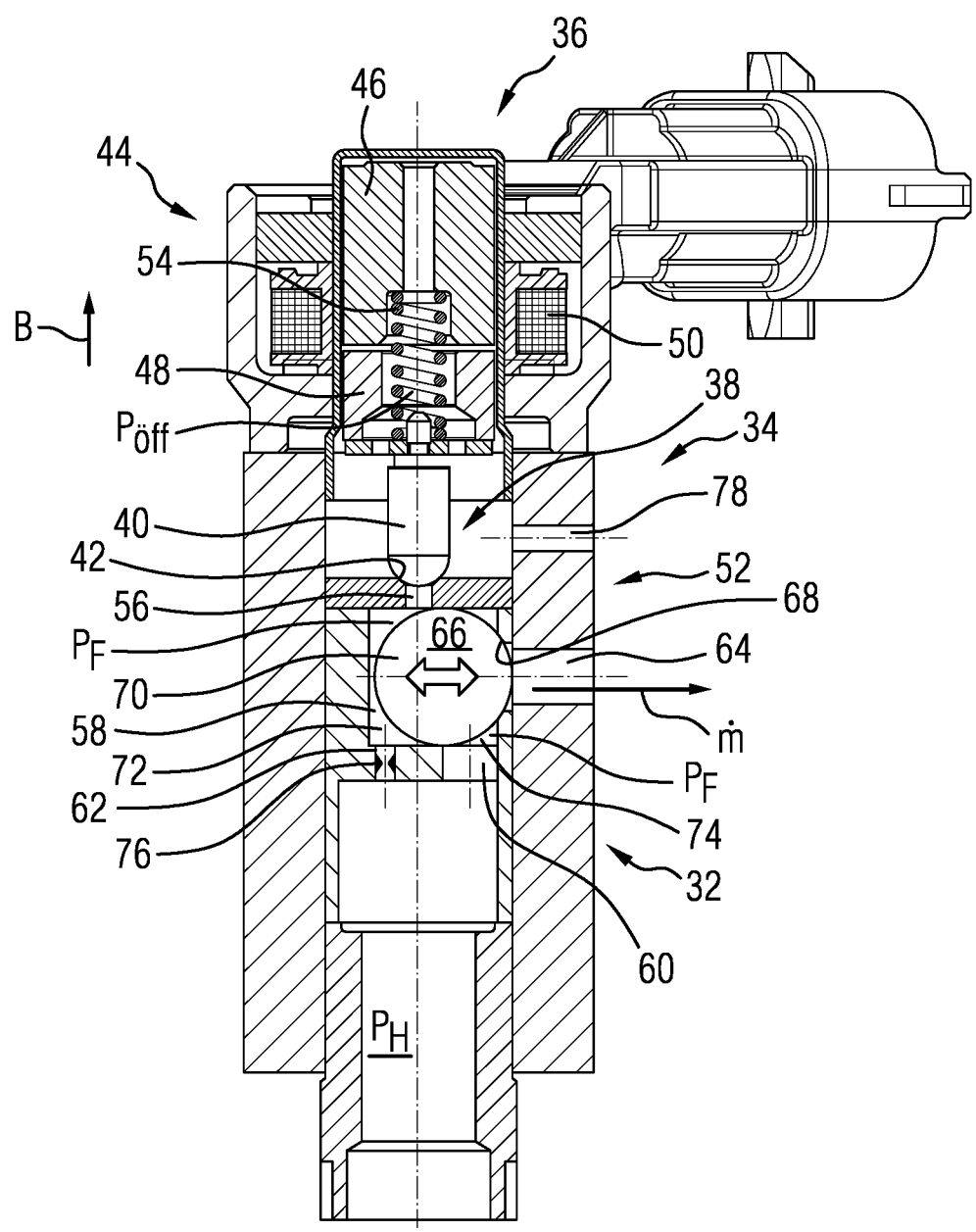
FIG. 6 shows a schematic longitudinal sectional view of a second embodiment of the airbag module from FIG. 2 with a valve arrangement, in which a pilot valve is configured as a normally closed pilot valve.
Figure 7:
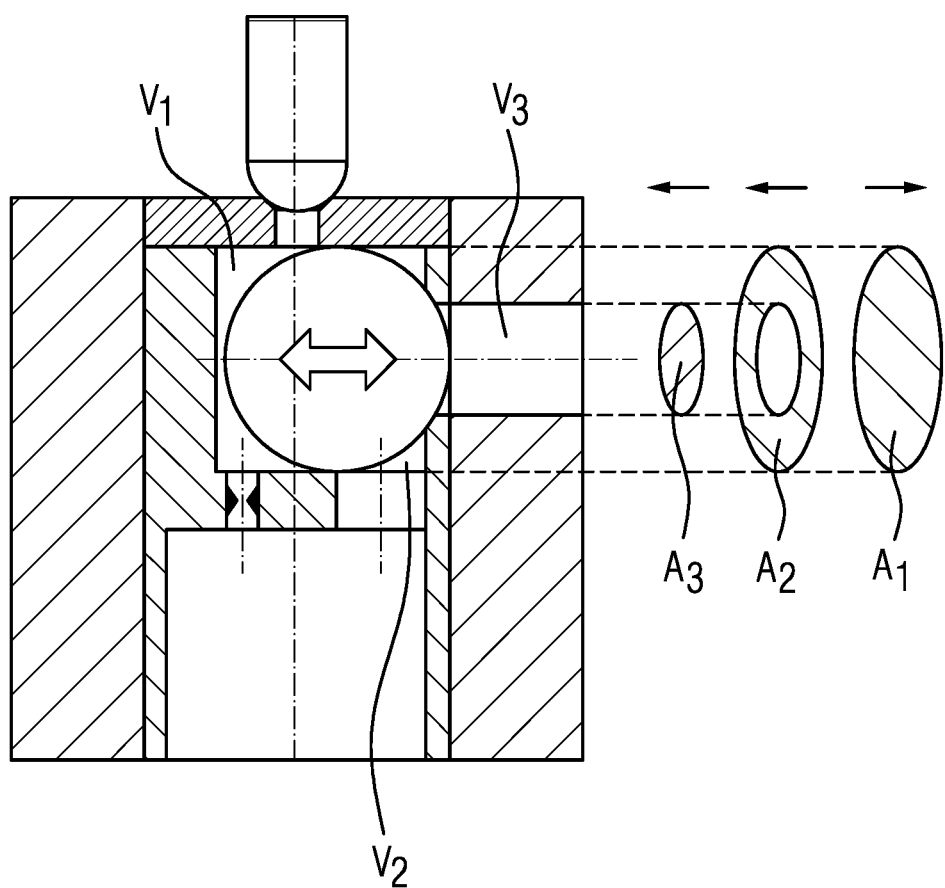
FIG. 7 shows a detailed representation of a hydraulic gearing arrangement for the pilot valve from FIG. 6.
Figure 8:
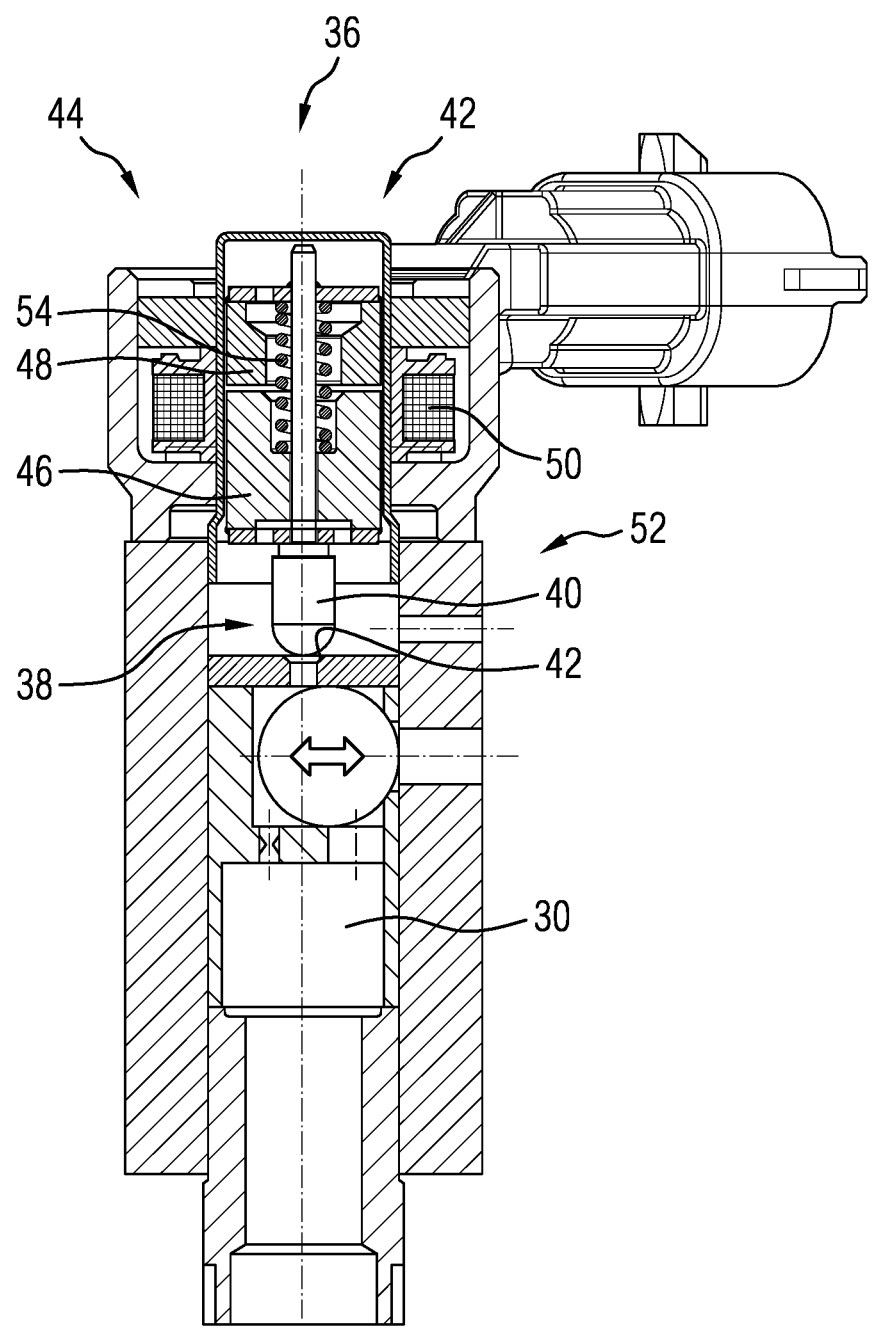
FIG. 8 shows a schematic longitudinal sectional view of the valve arrangement from FIG. 6, wherein the pilot valve is configured as a normally open pilot valve.

FIGS. 6, 7 and 8 show a second embodiment of the valve arrangement 34, wherein the pilot valve 36 or respectively the entire actuator region 44 is configured in accordance with the first embodiment in FIGS. 3 to 5. Merely the hydraulic gearing arrangement 52 differs in the second embodiment from that in the first embodiment.

In the case of the second embodiment, the pressure-action surfaces $A_1$, $A_2$ and $A_3$ are, as can be seen in particular in FIG. 7, transposed compared with the first embodiment. The second pressure-action surface $A_2$ between the outside diameter of the closing element 66 and the seat diameter of the valve seat 68 acts in the connecting bore 60 from the gas generator 30. In the region of the third volume $V_3$, the pressure from the outlet bore 64 to the airbag 22 or respectively from the airbag 22 acts on the third pressure-action surface $A_3$ of the closing element 66. The second pressure-action surface $A_2$ is located between the outside diameter of the closing element 66 and the seat diameter of the valve seat 68. The fluid pressure $P_F$ in said region is very much lower than in the connecting bore 60. The forces on the closing element 66 act in the same direction on the closing element 66.

In the first control chamber region 72, the corresponding first pressure-action surface $A_1$ acts on the outside diameter of the closing element 66. The direction of action of the fluid pressure $P_F$ on the first pressure-action surface $A_1$ is in the opposite direction to the force on the two pressure-action surfaces $A_2$ and $A_3$. If the prevailing fluid pressure $P_F$ in the first control chamber region 72 is high, the force on the first pressure-action surface $A_1$ is greater than the total of the forces on the two pressure-action surfaces $A_2$ and $A_3$. The closing element 66 closes and seals against the valve seat 68. If the prevailing fluid pressure $P_F$ in the first control chamber region 72 is low, the force on the first pressure-action surface $A_1$ is smaller than the total of the forces on the two pressure-action surfaces $A_2$ and $A_3$. The closing element 66 opens and releases the throughput to the airbag 2.

In the second embodiment, the valve seat 68, on which the closing element 66 sits in the closing position, is not formed on the connecting bore 60, but on the outlet bore 64.

The valve arrangement 34 in FIG. 6 merely differs from the valve arrangement 34 in FIG. 8 in that the valve arrangement 34 has, in FIG. 6, a normally closed pilot valve 36 and the valve arrangement 34 has, in FIG. 8, a normally open pilot valve 36.

The advantage of the embodiments described above is that the entire valve arrangement 34 can, in each case, be constructed in a very robust and compact manner, wherein the closing element 66 is configured very simply. Thanks to the construction in the pre-controlled construction form with the aid of the pilot valve 36, it is possible to control large mass flows m with a relatively small pilot valve 36. By exchanging the pilot valve 36 from a normally opened construction form to a normally closed construction form, the utilization of the biased pilot valve element 40 and the pressure tap in front of the mass flow-limiting aperture 76, a variant constellation of different hydraulic gearing arrangements 52 can be produced relatively simply in accordance with the safety concept of the airbag system 18.

The invention claimed is:
1. An airbag module comprising:
an airbag to be filled with a pressurized gas during operation;
a gas generator configured to provide the pressurized gas; and
a gas supply connected between the gas generator and the airbag to supply the pressurized gas from the gas generator into the airbag;
wherein the gas supply comprises a valve arrangement configured to release a predefined mass flow of the pressurized gas from the gas generator;
wherein the valve arrangement comprises an electrically actuatable pilot valve configured to control the predefined mass flow of the pressurized gas, and a pneumatic transmission arrangement configured to amplify a stroke action of the pilot valve;
wherein the pneumatic transmission arrangement comprises a body that defines therein a control chamber, a connecting bore, a throttle bore arranged separately from the connecting bore, and a first outlet bore;
wherein the connecting bore and the throttle bore each respectively pneumatically connect the control chamber with the gas generator, and the first outlet bore pneumatically connects the control chamber with the airbag;
wherein the pneumatic transmission arrangement further comprises a closing element movably arranged in the control chamber so as to selectively close and open a valve seat disposed in the connecting bore or in the first outlet bore, and so as to subdivide the control chamber into first and second control chamber regions separate from one another; and
wherein the pilot valve comprises a valve body that defines therein a valve inlet bore and a valve outlet bore, the valve inlet bore pneumatically connects the control chamber with the pilot valve, and the valve outlet bore pneumatically connects the pilot valve with the airbag.

2. The airbag module according to claim 1, wherein the throttle bore pneumatically connects the first control chamber region with the gas generator, and wherein the pilot valve is configured to control a fluid pressure of the airbag pressurized gas in the first control chamber region.

3. The airbag module according to claim 1, wherein the connecting bore pneumatically connects the gas generator with the second control chamber region.

4. The airbag module according to claim 1, wherein the closing element is configured such that a first pressure-action surface area of the closing element on a side thereof facing the first control chamber region is greater than a second pressure-action surface area of the closing element on a side thereof facing the connecting bore or the first outlet bore in which the valve seat is disposed.

5. The airbag module according to claim 1, wherein the pilot valve is configured as a normally closed pilot valve, wherein the pilot valve comprises a pilot valve element, a pilot valve seat in the valve inlet bore, and a compression spring arranged to bias the pilot valve element into a closed position on the pilot valve seat, and wherein the compression spring is configured to establish an opening pressure of the pilot valve such that the opening pressure is greater than a prevailing high pressure of the pressurized gas in the gas generator due to an activation of the gas generator.

6. The airbag module according to claim 1, wherein the pilot valve is configured as a normally open pilot valve, and wherein the pilot valve comprises a pilot valve element and a compression spring arranged to bias the pilot valve element into a defined open position.

7. An airbag system comprising:
an airbag module according to claim 1; and
a control device configured to actuate the pilot valve, wherein the control device is configured to identify a collision course and, based on the collision course, to define the mass flow of the pressurized gas to be supplied to the airbag.

8. The airbag module according to claim 1, wherein the valve seat is disposed in the connecting bore.

9. The airbag module according to claim 1, wherein the valve seat is disposed in the first outlet bore.

10. The airbag module according to claim 1, wherein the closing element consists of a round ball.

11. An airbag module comprising:
a gas generator configured to provide a pressurized gas;
an airbag;
a gas supply device connected between the gas generator and the airbag, and configured to release a defined mass flow of the pressurized gas from the gas generator into the airbag;
wherein:
the gas supply device comprises an electrically actuatable pilot valve and a pneumatic transmission arrangement;
the pneumatic transmission arrangement comprises a transmission arrangement body that defines therein a control chamber;
the pneumatic transmission arrangement further comprises a closing element movably arranged in the control chamber to divide the control chamber into first and second control chamber regions on opposite sides of the closing element;
the transmission arrangement body further defines therein a throttle bore that pneumatically connects the first control chamber region with the gas generator, a connecting bore that pneumatically connects the second control chamber region with the gas generator, and a first outlet bore that pneumatically connects the second control chamber region with the airbag;
the pilot valve comprises a pilot valve body that defines therein a valve chamber, a pilot valve inlet bore that pneumatically connects the valve chamber with the first control chamber region, and a second outlet bore that pneumatically connects the valve chamber with the airbag; and
the pilot valve further comprises an electrical actuator and a valve element operatively connected with the electrical actuator to selectively open and close the pilot valve inlet bore.

12. The airbag module according to claim 11, wherein the closing element is movable between a closed position in which the closing element closes the connecting bore and an open position in which the closing element opens the connecting bore.

13. The airbag module according to claim 11, wherein the closing element is movable between a closed position in which the closing element closes the first outlet bore and an open position in which the closing element opens the first outlet bore.

14. The airbag module according to claim 11, wherein the closing element consists of a round ball.

* * * * *